United States Patent
Signaoff et al.

(10) Patent No.: US 7,710,978 B2
(45) Date of Patent: May 4, 2010

(54) SYSTEM AND METHOD FOR TRAVERSING A FIREWALL WITH MULTIMEDIA COMMUNICATION

(75) Inventors: Christopher S. Signaoff, Hutto, TX (US); Tom W. Opsahl, Flower Mound, TX (US); Edward M. Riley, III, Flower Mound, TX (US); Justin S. Signaoff, Round Rock, TX (US)

(73) Assignee: directPacket Research, Inc., Irving, TX (US)

( * ) Notice: Subject to any disclaimer, the term of this patent is extended or adjusted under 35 U.S.C. 154(b) by 398 days.

(21) Appl. No.: 11/403,549

(22) Filed: Apr. 13, 2006

(65) Prior Publication Data

US 2007/0242696 A1 Oct. 18, 2007

(51) Int. Cl.
*H04L 12/28* (2006.01)
*H04L 12/66* (2006.01)
*H04L 29/06* (2006.01)
*H04J 3/16* (2006.01)
*H04K 1/00* (2006.01)

(52) U.S. Cl. .................. 370/395.5; 370/401; 370/466; 370/469; 380/255; 713/151; 726/3

(58) Field of Classification Search ............. 370/395.5, 370/401, 466, 469; 380/255; 713/151; 726/3
See application file for complete search history.

(56) References Cited

U.S. PATENT DOCUMENTS

| | | | |
|---|---|---|---|
| 6,047,320 A | 4/2000 | Tezuka et al. | |
| 6,266,809 B1 | 7/2001 | Craig et al. | |
| 6,380,968 B1 | 4/2002 | Alexander et al. | |
| 6,434,140 B1 | 8/2002 | Barany et al. | |
| 6,611,503 B1 | 8/2003 | Fitzgerald et al. | |
| 6,614,465 B2 | 9/2003 | Alexander et al. | |
| 6,633,324 B2 | 10/2003 | Stephens, Jr. | |
| 6,633,985 B2 * | 10/2003 | Drell | 726/11 |
| 6,735,626 B1 | 5/2004 | Tezuka et al. | |
| 6,795,444 B1 | 9/2004 | Vo et al. | |
| 6,798,782 B1 | 9/2004 | Caronni et al. | |
| 6,963,583 B1 | 11/2005 | Foti et al. | |
| 7,016,935 B2 | 3/2006 | Lee et al. | |
| 7,020,130 B2 * | 3/2006 | Krause et al. | 370/352 |
| 7,023,465 B2 | 4/2006 | Stephens, Jr. | |
| 7,031,341 B2 * | 4/2006 | Yu | 370/469 |
| 7,039,701 B2 | 5/2006 | Wesley | |

(Continued)

OTHER PUBLICATIONS

International Search Report and Written Opinion issued for PCT/US2007/066435; Dated: Apr. 2, 2008; 9 Pages.

(Continued)

*Primary Examiner*—Alpus H Hsu
(74) *Attorney, Agent, or Firm*—Fulbright & Jaworski L.L.P.

(57) ABSTRACT

Systems and methods are disclosed for transporting multiport protocol traffic using a single-port protocol. Multiport protocol traffic from a first endpoint is converted into a single-port protocol for transport across a network. The traffic is sent over a commonly-open port and received at a second endpoint before being dispersed to the appropriate ports of the second endpoint. By converting the traffic to a single-port protocol and choosing which commonly open port to communicate the traffic through, firewalls between each endpoint may be traversed without changing any of their settings.

30 Claims, 5 Drawing Sheets

U.S. PATENT DOCUMENTS

| | | | |
|---|---|---|---|
| 7,159,036 B2 | 1/2007 | Hinchliffe et al. | |
| 7,177,929 B2 | 2/2007 | Burbeck et al. | |
| 7,181,530 B1 | 2/2007 | Halasz et al. | |
| 7,194,526 B2 | 3/2007 | Kanemitsu | |
| 7,206,808 B2 | 4/2007 | Babka et al. | |
| 7,251,689 B2 | 7/2007 | Wesley | |
| 7,293,169 B1 | 11/2007 | Righi et al. | |
| 7,328,406 B2 | 2/2008 | Kalinoski et al. | |
| 7,346,076 B1 | 3/2008 | Habiby et al. | |
| 7,346,912 B2 | 3/2008 | Seebaldt | |
| 7,353,380 B2 * | 4/2008 | VanHeyningen | 713/150 |
| 7,363,381 B2 | 4/2008 | Mussman et al. | |
| 7,370,097 B2 | 5/2008 | Hashimoto | |
| 7,372,957 B2 | 5/2008 | Strathmeyer et al. | |
| 7,385,622 B2 | 6/2008 | Babka et al. | |
| 7,436,428 B2 | 10/2008 | Schrader et al. | |
| 7,441,270 B1 * | 10/2008 | Edwards et al. | 726/15 |
| 2003/0065737 A1 | 4/2003 | Aasman | |
| 2003/0081783 A1 * | 5/2003 | Adusumilli et al. | 380/270 |
| 2003/0182451 A1 | 9/2003 | Grass et al. | |
| 2003/0227908 A1 | 12/2003 | Scoggins et al. | |
| 2003/0232648 A1 * | 12/2003 | Prindle | 463/40 |
| 2004/0037268 A1 | 2/2004 | Read | |
| 2004/0158606 A1 | 8/2004 | Tsai | |
| 2005/0021610 A1 | 1/2005 | Bozionek et al. | |
| 2005/0122964 A1 | 6/2005 | Strathmeyer et al. | |
| 2005/0125696 A1 | 6/2005 | Afshar et al. | |
| 2005/0243747 A1 | 11/2005 | Rudolph | |
| 2005/0259145 A1 | 11/2005 | Schrader et al. | |
| 2005/0271051 A1 | 12/2005 | Holloway et al. | |
| 2006/0098684 A1 | 5/2006 | Bozionek et al. | |
| 2006/0104288 A1 * | 5/2006 | Yim et al. | 370/395.52 |
| 2006/0109862 A1 | 5/2006 | Choi et al. | |
| 2006/0187903 A1 | 8/2006 | Kallio et al. | |
| 2006/0190719 A1 * | 8/2006 | Rao et al. | 713/160 |
| 2006/0224883 A1 * | 10/2006 | Khosravi et al. | 713/151 |
| 2007/0005804 A1 * | 1/2007 | Rideout | 709/246 |
| 2007/0022201 A1 | 1/2007 | Aaby et al. | |
| 2007/0036143 A1 | 2/2007 | Alt et al. | |
| 2007/0239841 A1 | 10/2007 | Lehrman | |
| 2007/0242696 A1 | 10/2007 | Signaoff et al. | |
| 2008/0043091 A1 | 2/2008 | Lia et al. | |
| 2008/0134200 A1 | 6/2008 | Seebaldt | |
| 2008/0235362 A1 | 9/2008 | Kjesbu et al. | |
| 2009/0051752 A1 | 2/2009 | Lammers | |
| 2009/0112671 A1 | 4/2009 | Grodum | |

OTHER PUBLICATIONS

International Search Report and Written Opinion issued for PCT/US2007/066451; Dated: Jul. 7, 2008; 11 Pages.

International Search Report and Written Opinion issued for PCT/US07/66457 dated Jun. 17, 2008, 10 pgs.

International Search Report and Written Opinion issued for PCT/US2007/066460; Dated: Apr. 9, 2008; 10 Pages.

* cited by examiner

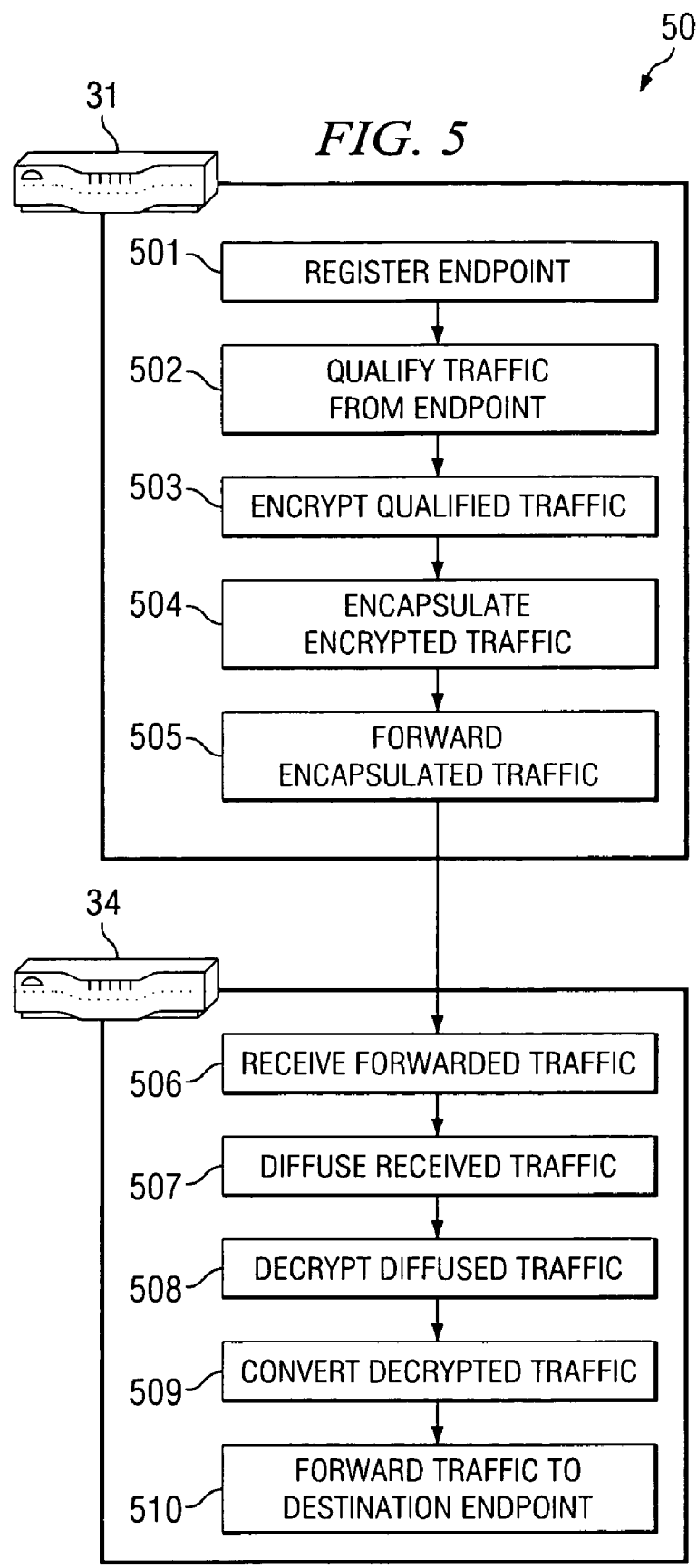

SYSTEM AND METHOD FOR TRAVERSING A FIREWALL WITH MULTIMEDIA COMMUNICATION

TECHNICAL FIELD

The present invention relates, in general, to electronic communications, and, more specifically, to transmitting communication data within a multimedia communication system.

BACKGROUND OF THE INVENTION

The Internet may be used for many forms of communication, including voice conversations, video conferencing, development collaboration, and the like. In order for a manufacturers' programs, applications, equipment, and systems to be interoperable with each other, many protocols have been developed to standardize the communication between such systems. These protocols have grown increasingly complex to handle all the types of traffic generated to facilitate communication for video conferencing, voice over Internet Protocol (VoIP), and data over Internet Protocol applications. Two such protocols are H.323 from the International Telecommunication Union—Telecommunication Standardization Sector (ITU-T) and the Session Initiation Protocol (SIP) from the Internet Engineering Task Force (IETF). Both H.323 and SIP typically allow for multimedia communication including voice, video, and data communications in real-time.

In Internet Protocol (IP) communication networks, devices or endpoints on the network are identified by their respective IP address. Applications and programs on the different devices further identify each other using port numbers. A port number is a sixteen bit integer, the value of which falls into one of three ranges: the well-known ports, ranging from 0 through 1023; the registered ports, ranging from 1024 through 49151; and the dynamic and/or private ports, ranging from 49152 through 65535. The well-known ports are reserved for assignment by the Internet Corporation for Assigned Names and Numbers (ICANN) for use by applications that communicate using the Transmission Control Protocol (TCP) or User Datagram Protocol (UDP) and generally can only be used by a system/root process or by a program run by a privileged user. The registered ports may be registered for use by companies or other individuals for use by applications that communicate using TCP or UDP. The dynamic or private ports, by definition, cannot be officially registered nor are they assigned. Both the H.323 and SIP standards use multiple, well-known, registered, and/or dynamic ports in order to facilitate such communication.

H.323 and SIP each rely on multiple other protocols, some of which may in turn rely on UDP for sending and receiving multimedia traffic. UDP features minimal overhead compared to other transport protocols (most notably TCP) at the expense of having less reliability. UDP does not provide for guaranteed packet delivery nor data integrity. UDP does offer the highest possible throughput, thus, making it ideally suited for multimedia real-time communications.

Multimedia communications traffic will most likely have to traverse a firewall at some point during transmission, especially over the Internet, regardless to which protocol the traffic conforms. Firewalls are used in modem networks to screen out unwanted or malicious traffic. One of many techniques a firewall may use is packet filtering, wherein the firewall determines whether or not to allow individual packets by analyzing information in the packet header (such as the IP address and port of the source and destination). Thus, various ports or IP addresses may be blocked to minimize the risk of allowing malicious traffic into an important computer network or system. Another more advanced technique is called stateful inspection, wherein in addition to analyzing header information, a firewall keeps track of the status of any connection opened by network devices behind the firewall. Deciding whether or not a packet is dropped in a stateful inspection is based on the tracked status of the connection and information from within the packet header. In practice, firewalls (especially those used by large corporations) generally only allow traffic from the well-known ports, though such firewalls may be specially configured to allow traffic on any port. For multimedia communication systems that use multiple registered and dynamic ports, firewalls (unless specially configured) will generally block the data traffic on these ports between multimedia systems, thus, preventing communication.

Video conferencing endpoints generally use multiple dynamic ports for the transmission of communication data packets and, as such, each port used necessitates opening that port on a firewall. Additionally, different endpoints participating in different conversations use different sets of ports, further increasing the number of ports to be opened on a firewall. Reconfiguring ports on a firewall is a time consuming task that introduces the risk of human error, which may defeat the purpose of the firewall by leaving a network vulnerable to malicious attacks. Furthermore, even though these dynamic ports should be closed after the communication ends, in practice, once a firewall port is open, it remains open because the firewall technicians typically do not expend the additional time resources to close the ports.

Additionally, many video conferencing systems do not support encryption. In such cases the communication between endpoints is not secure and may be intercepted while being transmitted across the Internet.

Existing video conferencing systems such as TANDBERG's BORDER CONTROLLER™, a component of TANDBERG's EXPRESSWAY™ firewall traversal solution, requires the use of TANDBERG Gatekeepers or TANDBERG traversal enabled endpoints. While allowing firewall traversal, the EXPRESSWAY™ solution still requires user intervention to select and trust a range of ports on a firewall and requires the purchase of TANDBERG equipment to use existing legacy video conference endpoints that are not traversal-enabled. The V2IU™ series of products from Polycom, Inc., are Application Level Gateways (ALG) that act as protocol-aware firewalls that automate the selection and trusting of ports, but as such, multiple ports are still used when sending traffic between endpoints with the risk of having such traffic being blocked by a non-protocol-aware firewall. Further, such an ALG does not provide for secure communication. The PATHFINDER™ series of products from RadVision, Ltd., provides for firewall traversal via multiplexing to a single port, but still requires opening a port on a firewall. Multiplexing is implemented by taking sections of data from each of the data streams coming through the various ports and placing them alternately into a single stream. Thus, the resulting stream is simply a train of interleaved data bits that are not recognized as any particular communication protocol. At the destination end point, a packet constructor picks each data bit and places it in the appropriate stream on the appropriate port and rebuilds the original stream.

Similar systems have been implemented for voice, VoIP, and data over IP communication systems. Each either relies on a proprietary system or equipment or relies on actually selecting and opening multiple ports in a firewall that could leave the underlying network vulnerable to malicious electronic attacks.

BRIEF SUMMARY OF THE INVENTION

The present invention is directed to a system and method for transporting multiport protocol traffic using a single-port protocol that is known to be transmitted on a port that is typically open on standard firewalls. Multiport protocol traffic from a first endpoint is converted in to a single-port protocol for transport across a network. The traffic is then reconverted to the multiport protocol and directed to the appropriate ports at a targeted second endpoint. In being converted into the single-port protocol, the traffic may then traverse a firewall by using a well-known port, such that little or no reconfiguration of the firewall is required. In so doing, the risk of human error leaving a network vulnerable to malicious attacks is reduced. Moreover, instead of creating an unrecognizable data stream, which may still be rejected by more-advanced firewalls, such as through multiplexing, the various embodiments of the present invention actually creates a known, single-port communication protocol.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 5 is a flowchart showing for an embodiment of the invention, example steps that may be employed to traverse a firewall.

DETAILED DESCRIPTION OF THE INVENTION

A variety of protocols require the use of multiport traffic. Whether the traffic is data between applications, voice communications, or video conferencing, whenever multiport traffic is used there is a possibility of some or all of the traffic being blocked by a firewall between two devices that are attempting to communicate. As an example, video conferencing systems, whether they are based on H.323, SIP, or other similar multimedia communication protocols, use multiple ports and multiple protocols in order to enable two-way audio and video communication. The communication protocols specify different types of traffic that may be sent between endpoints which include media traffic (voice, video, and the like) along with the control traffic (camera, connection control, and the like). The media traffic is comprised of data for the images and sound being transmitted between endpoints with the control traffic comprising data used to control the connection between endpoints and the features of the endpoint (e.g., camera direction, zoom, and the like). Due to its higher throughput rate, UDP may typically be utilized for the real-time communication traffic between endpoints. TCP may be utilized for traffic requiring data integrity (e.g., control traffic). As such, video conferencing systems typically make use of both TCP and UDP to transport the multimedia data to enable communication. The ports that are typically used to enable the two-way communication include various ports across the well-known ports, the registered ports, and the dynamic ports. Firewalls are usually set up to block unrequested traffic and/or traffic coming in on dynamic ports. Furthermore, UDP does not provide a mechanism for identifying received traffic as requested traffic. Thus, programs and endpoints that send traffic conforming to UDP are at risk of having that traffic blocked by the remote endpoint's firewall for both being unrequested and being sent on a blocked port.

Figure 1:
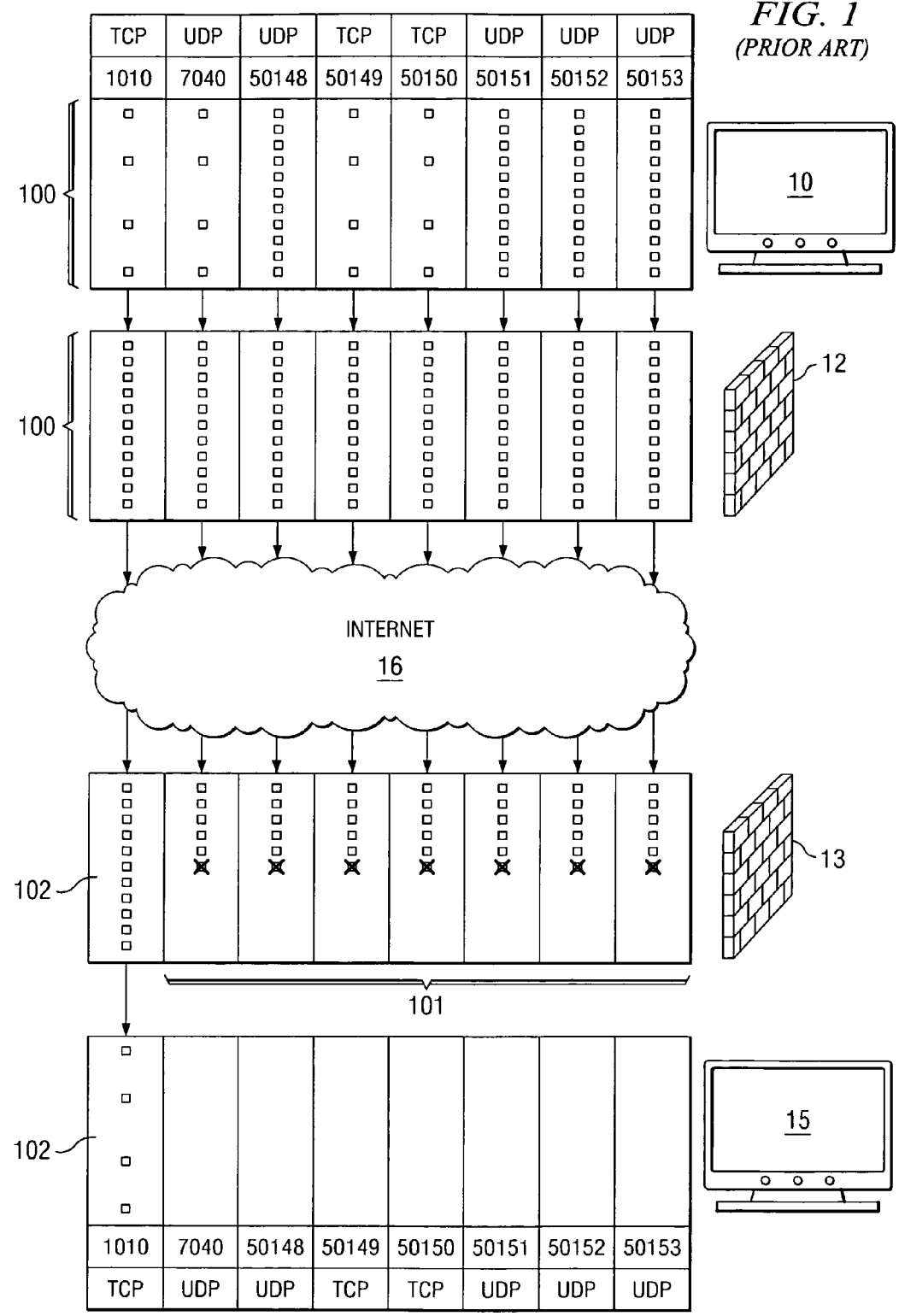
FIG. 1 is a diagram illustrating the flow of packets in a typical IP communication system.

Referring to FIG. 1, video conference endpoint 10 attempts to send multimedia data to video conference endpoint 15. Multiport packets 100 sent from well-known port 1010, registered port 7030, and dynamic ports 50148-50153 are being transmitted to video conference endpoint 15. Firewall 12 passes all the outgoing traffic (packets 100) on all ports since this traffic has originated from the network inside of firewall 12. The traffic is transmitted across Internet 16 and is received by firewall 13, which is operating in a standard mode. In the standard mode, firewall 13 blocks dynamic ports and unrequested traffic (packets 101), such that only the TCP traffic (packets 102) on well-known port 1010 is received by endpoint 15. Thus, with each endpoint being behind their respective firewalls, neither two-way nor one-way communication can take place.

Figure 2:
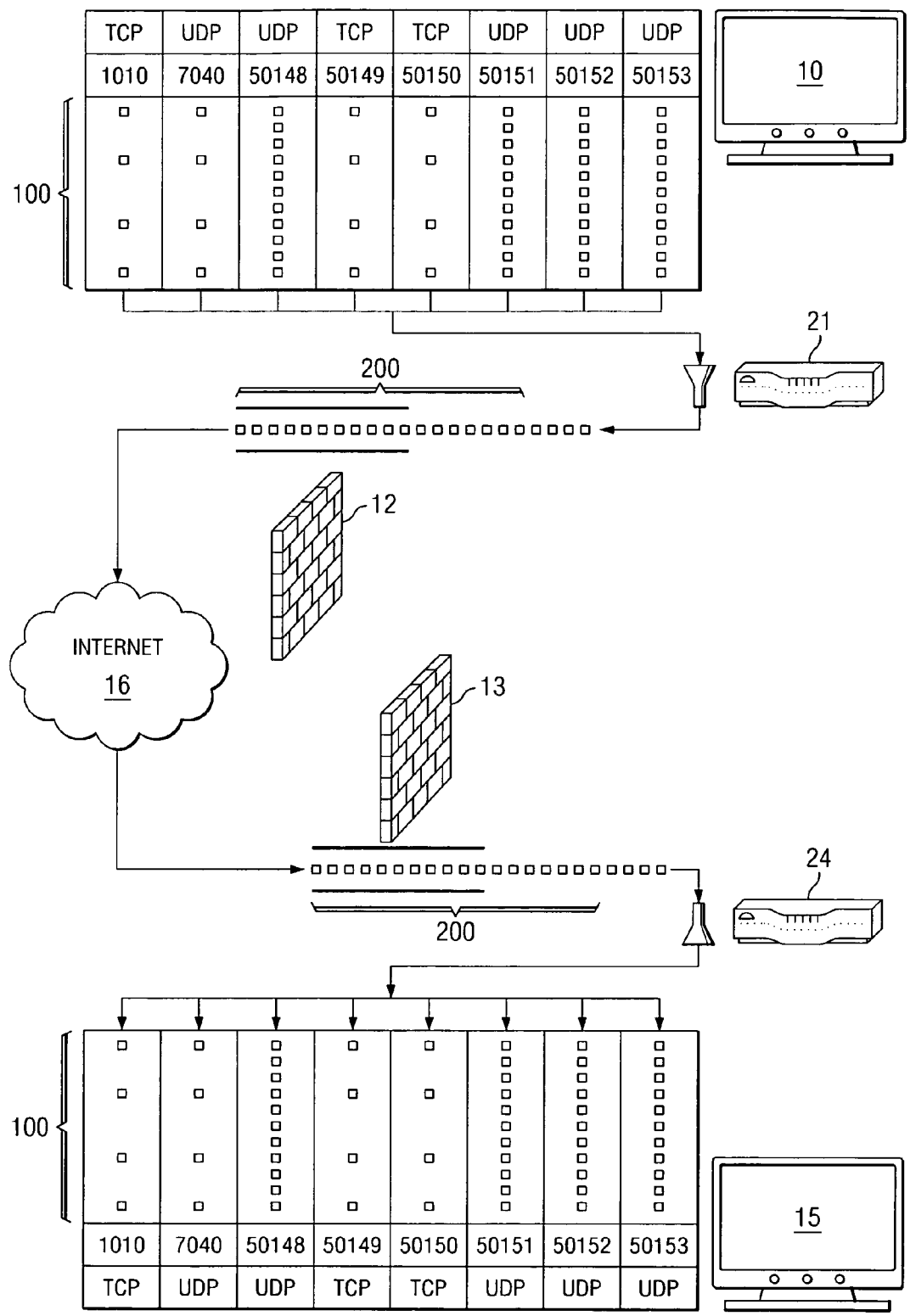
FIG. 2 is a diagram illustrating an IP communication system configured according to one embodiment of the present invention.

Referring to FIG. 2, video conference endpoint 10 again attempts to send multimedia data (packets 100) to video conference endpoint 15, this time with network devices 21 and 24 in the system. In this embodiment, endpoint 10 is a video conference endpoint that uses a multiple port communication protocol in order to establish communication with endpoint 15. For the purposes of this example, endpoint 10 uses ports 1010, 7030, 50148-50153. The data transmitted using ports 1010 and 50149-50150 utilize TCP as the transport protocol while the data transmitted using ports 7030, 50148, and 50151-50153 utilize UDP as the transport protocol. Packets from each of these ports conforming to these various protocols and sub-protocols are received by network device 21. It should be noted that additional or alternative examples of endpoints may use more or fewer ports of different numbers based in part on the applications or protocols used to facilitate multimedia communication.

The received packets are encapsulated to conform to a protocol used by devices 21 and 24 for transmitting data, which may include, but is not limited to: TCP, UDP, Stream Control Transmission Protocol (SCTP), Datagram Congestion Control Protocol (DCCP), Real-time Transport Protocol (RTP), and the like. Device 21 receives packets 100 from endpoint 10 that conform to both TCP and UDP, encapsulates each of multiport packets 100 into single-port packets 200 that conform to a single-port communication protocol used by devices 21 and 24, and sends packets 200 to device 24. The method of encapsulation may comprise using some or all of the information (header and data) within each of packets 100 as the data section for encapsulated packets 200.

The encapsulated packets are sent to device 24 using any of the well-known or registered ports, which are the ports that are typically open in standard firewalls. One such well-known port that could be chosen is port 443, which is commonly reserved for HTTPS traffic by ICANN and is commonly open by default on most firewalls. While the packets may be sent along any of the well-known, registered, or dynamic ports, the preferable port used may be a port that is commonly open on most firewalls in their standard configurations (e.g., the well-known ports, certain registered ports, and the like).

Firewall 12 inspects the traffic from device 21 before sending it out through Internet 16 to device 24. When the traffic arrives at firewall 13, it inspects the traffic, determines that it is valid traffic on a well-known port, and passes it along to device 24.

Device 24 receives encapsulated single-port packets 200 sent from device 21. Device 24 then reconstructs multiport packets 100 using packets 200. Reconstruction may be performed by any suitable method including hash-like functions or tables. As an example, header information within one of packets 200 may be an input to a hash-like function that returns the destination IP address and port numbers for a given packet. In the case of a hash-like table, device 21 may use a portion of the header or data in each of packets 100 as the index of a hash-like table and then convert packets 100 to packets 200. Device 24 upon receiving packets 200, may use a portion of the header or data in each of packets 200 as the index of a hash-like table and then reconvert packets 200 back to packets 100, recovering the original IP addresses and ports based on information stored in the hash-like table.

From the original headers, device 24 determines for each packet that it is for delivery to endpoint 15. Device 24 then sends the packets to endpoint 15 using each packet's destination port. Thus, if a port and protocol are advantageously chosen (such as port 443 and Secure Sockets Layer (SSL)), communications traffic from endpoint 10 may be sent to endpoint 15 with no modification or user intervention to traverse firewalls 12 and 13. While one-way communication is described (from endpoint 10 to endpoint 15) it is noted that each of devices 21 and 24 may perform the steps of receiving multiple packets, encapsulation, port translation, decapsulation, and resending multiple packets in order to enable two-way communication between endpoints 10 and 15. Additional or alternative embodiments may use any of the well-known or registered ports that are typically or commonly open in standard firewalls to send packets between devices 21 and 24. While any of the well-known, registered, or dynamic ports may be used, it is preferable to select a port that is commonly open in firewalls.

It should be noted that in additional or alternative embodiments of the present invention, network or other errors may occasionally lead to lost or corrupted packets and some protocols (such as TCP) specify that in such cases these lost or corrupted packets be resent, which is at odds with maintaining real-time communication. With real-time communication, current data takes precedence over lost previous data since resent packets of previously lost or corrupt data may arrive too late to be useful. As such, when receiving a request to resend a packet containing real-time data (e.g. data corresponding to the audio or video of the communication) devices 21 and 24 may simply ignore the resend request or, alternatively, send a current data packet masquerading as the previously sent and subsequently lost packet, as alternate data.

Figure 3:
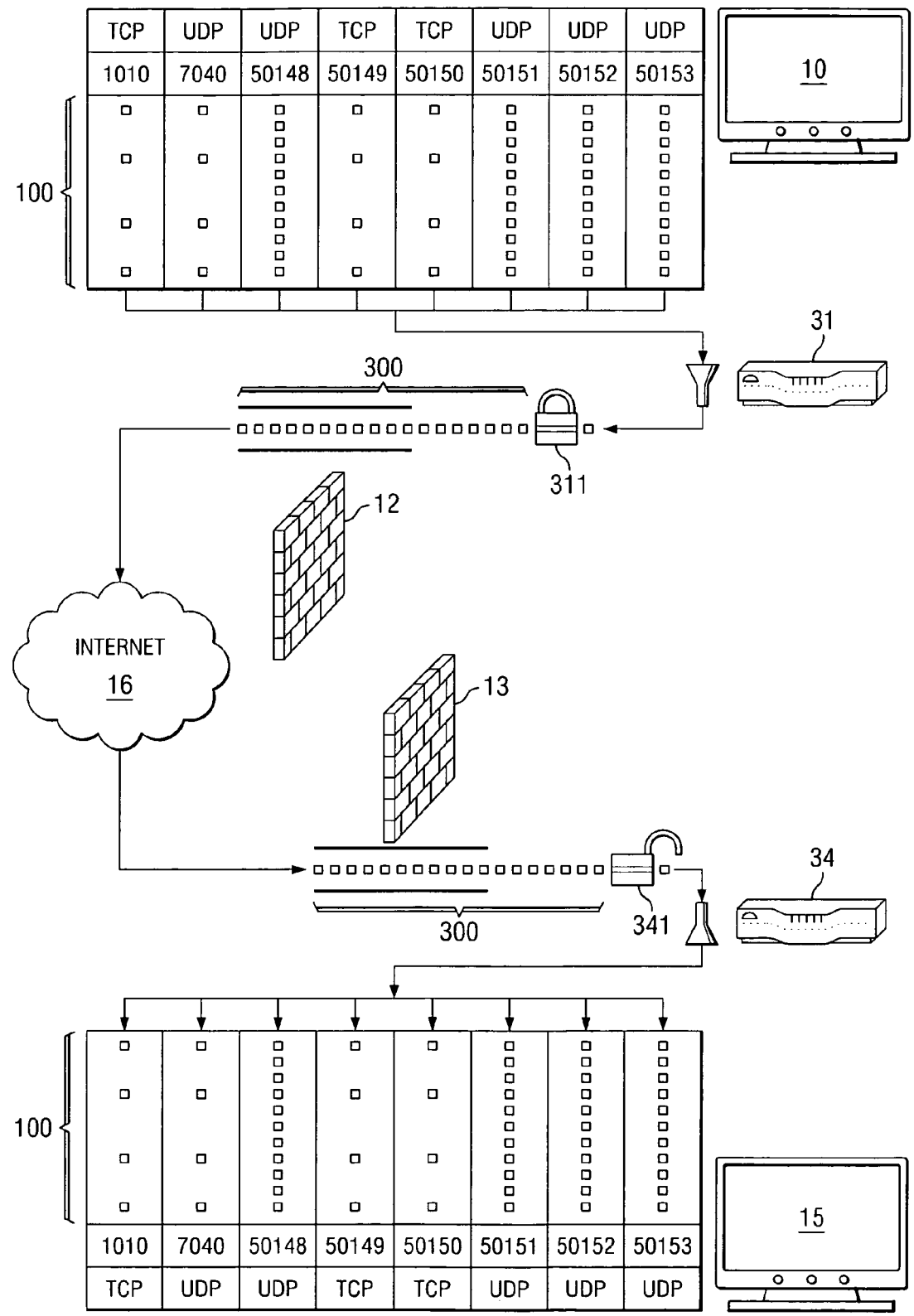
FIG. 3 is a diagram illustrating an IP communication system configured according to another embodiment of the present invention, which includes encryption.

Referring to FIG. 3, device 31 adds encryption layer 311 to the data. Any method or algorithm of encryption may be used including, but not limited to: 128-bit Advanced Encryption Standard (AES); Triple Data Encryption Standard (TDES); Skipjack, or the like. Some or all of each packet received may be encrypted, including the header, which contains the source and destination port numbers associated with the packet. With all of the packets 100 from endpoint 10 having an added layer of encryption and becoming packets 300, the media traffic along with the control traffic between endpoints 10 and 15 are secured for transmission across Internet 16. Device 34 receives secure packets 300 and removes encryption layer 311 before reconstructing packets 100. The reconstructed packets 100 are then dispersed to endpoint 15 addressed to the appropriate ports expected by endpoint 15.

In alternative or additional embodiments, devices 21/31 and 24/34 may also qualify their incoming traffic in order to securely pass traffic associated with the connection between endpoints 10 and 15. As an example, endpoint 10, upon being connected to device 21/31, may register itself with device 21/31 as a video conferencing endpoint. When endpoint 10 begins using network ports for a conference call or other connection, device 21/31 may identify those ports as being used and, if appropriate, begin converting and encrypting the traffic associated with such ports. This qualification and registration process my be performed by the use of a hash-like function, so that device 21/31 may efficiently perform the qualification. As an example, endpoint 10 may register port 50152 and start sending packets. For every packet received, the source IP address and port may be the inputs to a hash-like function that determines whether a received packet is qualified for further processing and transmission. In the case of a hash-like table, device 24 may use a portion of the header or data in each of packets 200 as the index of a hash-like table and then determine whether a packet is qualified based on information stored in the hash-like table.

While each of devices 21 and 24 is depicted connected to a single video conferencing system, they may be connected to multiple and various video conference systems, H.323 gatekeepers, H.323 gateways, SIP proxies, SIP registrars, or the like. When multiple video conferencing systems are connected to a device, such as device 21, any connections or calls that do not require traversing a firewall may accordingly not be converted into a single-port communication protocol. As an example, if two video conference endpoints are on the same network behind a firewall and are engaging in communications, this traffic does not pass through a firewall (the traffic is only transmitted on the internal network). Thus, devices 21/31 may recognize this situation and, accordingly, not encapsulate nor encrypt the traffic between two such endpoints.

Additionally, device 21 need not be a stand-alone device as its functionality may be integrated into any other network device including, but not limited to: video conference systems, firewalls, H.323 gateways, SIP proxies, SIP registrars or the like. Alternative embodiments may also send traffic between endpoints 10 and 15 that conform to any number of standards or protocols for multimedia communication including, but not limited to the H.323 and SIP protocols by converting the multiport communication protocols into a single-port protocol that uses a port that is typically open on most firewalls.

Figure 4:
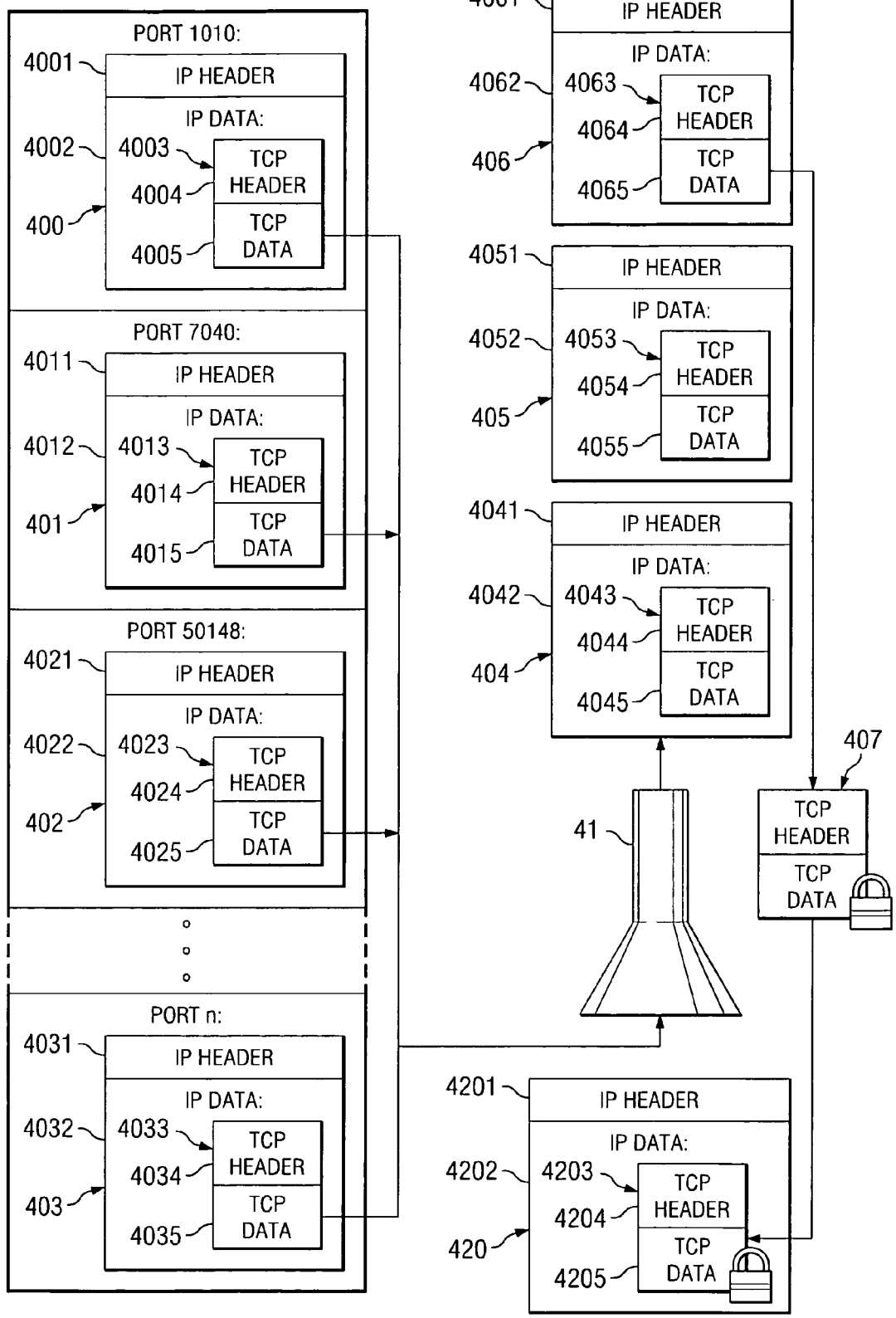
FIG. 4 is a diagram illustrating the handling of packets.

FIG. 4 is a diagram illustrating the handling of packets. Devices implementing the various embodiments of the invention receive multiple IP data packets (400-403) from multiple ports (1010, 7040, 50148, . . . , n). Each packet has an IP header (4001/4011/4021/4031) and an IP data section (4002/4012/4022/4032). The IP header contains information for properly delivering a packet to a destination including, among other things: a source IP address, a destination IP address, and the total length of the packet. The IP data section contains the data being transmitted, which is usually another packet conforming to a different protocol such as TCP, UDP, or the like. The TCP and UDP packets (4003/4013/4023/4033) found within IP packets 400-403, each also have a header (4004/4014/4024/4034) and data (4005/4015/4025/4035) sections. Headers 4004/4014/4024/4034 of TCP and UDP packets 4003/4013/4023/4033 have the source and destination ports of a packet.

Each packet received is treated the same regardless of the packet's source port or to which protocol the packet conforms. After being received, each IP packet's data section (4042/4052/4062) may be encrypted and then become the data section of a new packet, which may conform to a different protocol for single-port communication. As an example, packet 407 is the encrypted TCP packet 4063 of IP packet 406. IP packet 420 contains TCP packet 4203, whose TCP data section 4205 is packet 407. This method allows the original source and destination ports identified in packet 406's TCP header to be saved and also encrypted such that when packet 420 is transmitted across the Internet, it may not be identified as using a port associated with video conferencing, further increasing security. Additionally, in creating a new TCP packet, the port address may effectively be changed. As an example, a packet received from port 1010 could be sent out on port 443, with the original source port being saved in an encrypted form within packet 407. TCP data section 4205 of packet 420 may also contain encrypted or non-encrypted UDP packets, RTP packets, or IP packets instead of the encrypted TCP packet portrayed. As an example, IP packet 406 may be the TCP data 4205 of packet 420. Accordingly, additional or alternative embodiments may encrypt the entire IP packet (404-406) instead of or in addition to the IP data sections (4042/4052/4062).

FIG. 5 is a flowchart that shows for an embodiment of the invention, example steps that may be employed by devices 31 and 34 to traverse a firewall. An endpoint, when connected to a network, first registers with device 31 by the endpoint identifying itself as a compliant endpoint (e.g., it is an endpoint that conforms to H.323, SIP, VoIP, or the like), as shown by step 501.

On a given network, multiple devices may be connected, as such, device 31 may receive traffic from many devices within that network. Thus, device 31 qualifies the traffic it receives to ensure that the traffic sent to device 34 is appropriate traffic. This is shown in step 502 and may be accomplished by comparing a given packet's source IP and port addresses to those of endpoints that have registered with device 31. In step 503, device 31 encrypts the previously qualified traffic securing the communication between two endpoints using any suitable encryption method including, but limited to: AES 128-bit, TDES, Skipjack, or the like. In step 504, the encrypted traffic is then encapsulated to conform to a single port protocol, such as SSL, by placing the previously encrypted packet into a new packet conforming to SSL protocol. As shown by step 505, the encapsulated traffic is then forwarded to device 34.

In step 506, device 34 receives the single port traffic from device 31 and is diffused by step 507 by restoring the original IP addresses and port numbers to the individual packets. In step 508, this diffused traffic is then decrypted, thus, recovering the original multimedia and control communication information within the packets. In step 509, the packets are then restored to their original transport protocol, such as TCP, UDP, or the like. With the packets being fully restored, they are then forwarded to the destination endpoint by device 34, as shown by step 510.

It is noted that while the disclosure has used the communication between two video conference endpoints as an example, it is understood that the systems and methods described may be used by other programs, applications, communications systems, and the like, that use multiport protocols for communication. As such, embodiments of the invention may be used for audio systems VoIP systems, or any other system that uses a multiport protocol to transfer data between devices. Referring back to FIG. 2 as an example, endpoints 10 and 15 may be VoIP endpoints engaging in voice communication. In this embodiment the multiport VoIP protocol traffic from endpoint 10 may be received by device 21, converted to a single port protocol by device 21, encapsulated by device 21, transmitted to device 24, decapsulated by device 24, converted back to the original multiport protocol by device 24, transmitted to endpoint 15, and received by endpoint 15, as described in further detail above. The same holds true for other types of programs, equipment, or applications using a multiport protocol to transfer data across a network.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for communication between two or more endpoints, said method comprising:

receiving, at a first intermediate communication device that is communicatively coupled with a first endpoint communication device, a plurality of multiport packets of data in a multiport communication protocol for communication from the first endpoint communication device;

converting, by said first intermediate communication device, said plurality of multiport packets into a plurality of single-port packets in a single-port communication protocol;

transmitting from said first intermediate communication device said plurality of single-port packets over a commonly-open port to at least a second intermediate communication device that is communicatively coupled with one or more other endpoint communication devices, said plurality of single-port packets traversing one or more firewalls using said commonly-open port;

receiving said plurality of single-port packets at said at least a second intermediate communication device;

reconverting, by said at least a second intermediate communication device, said received plurality of single-port packets into said multiport communication protocol resulting in reconverted plurality of multiport packets; and delivering, from said at least a second intermediate communication device to said one or more other endpoint communication devices, said reconverted plurality of multiport packets using two or more ports associated with said multiport communication protocol.

2. The method of claim 1, further comprising:
encrypting said plurality of single-port packets in said single-port communication protocol prior to said transmitting.

3. The method of claim 2, further comprising:
decrypting said encrypted plurality of single-port packets prior to said reconverting.

4. The method of claim 2, wherein said encrypting is according to one of:
an Advanced Encryption Standard (AES) 128-bit algorithm;
a Triple Data Encryption Standard (TDES) algorithm; or
a Skipjack algorithm.

5. The method of claim 1, wherein:
said single-port communication protocol comprises:
Secure Sockets Layer (SSL) protocol.

6. The method of claim 1, wherein:
a portion of said plurality of multiport packets conforms to a first transmission protocol of said multiport communication protocol;
another portion of said plurality of multiport packets conforms to a second transmission protocol of said multiport communication protocol; and
wherein said transmitting comprises transmitting said plurality of single-port packets using said first transmission protocol in said single-port communication protocol.

7. The method of claim 6, wherein said first transmission protocol comprises Transmission Control Protocol (TCP); and
said second transmission protocol comprises User Datagram Protocol (UDP).

8. The method of claim 6, further comprising: sending alternate data instead of requested data in response to a resend request.

9. The method of claim 1, further comprising:
qualifying said plurality of multiport packets, wherein said qualifying comprises:
registering a network device;
using network ports by said registered network device;
determining whether said plurality of multiport packets originated from a network port used by said registered network device; and
allowing further transmission of said plurality of multiport packets based on said determining.

10. The method of claim 1, wherein said commonly-open port is a well-known port.

11. The method of claim 1, wherein said commonly-open port is port 443.

12. The method of claim 1 wherein said single-port communication protocol is acceptable by any of a plurality of different commonly-open transmission control protocol (TCP) ports.

13. The method of claim 1 wherein said single-port communication protocol is not hypertext transport protocol (HTTP).

14. A system comprising:
a first network device that is communicatively coupled with at least a first endpoint communication device, said first network device comprising:
an interface for receiving a plurality of multiport packets of data in a multiport communication protocol from two or more ports for communication from said at least a first endpoint communication device; and
a conversion table for said first network device to convert said plurality of multiport packets into a plurality of single-port packets in a single-port communication protocol, wherein said single-port communication protocol is acceptable by any of a plurality of different commonly-open transmission control protocol (TCP) ports, and wherein said interface communicates said converted plurality of single-port packets over a selected one of the plurality of different commonly-open TCP ports; and
a second network device that is communicatively coupled with at least a second endpoint communication device, said second network device comprising:
a second interface for receiving said converted plurality of single-port packets from said selected one of the plurality of different commonly-open TCP ports;
a second conversion table for reconverting said converted plurality of single-port packets into said multiport communication protocol, resulting in a reconverted plurality of multiport packets; and
wherein said second interface distributes each of said reconverted plurality of multiport packets to said two or more ports for communication to said at least a second endpoint communication device; and
wherein one or more firewalls are traversed between said first and second network devices using said selected one of the plurality of different commonly-open TCP ports.

15. The system of claim 14, further comprising:
an encryption application in said first network device for encrypting said plurality of packets in said single-port communication protocol; and
a decryption application in said second network device for decrypting said encrypted plurality of packets prior to said reconverting.

16. The system of claim 15, wherein said encrypting is according to one of:
an Advanced Encryption Standard (AES) 128-bit algorithm;
a Triple Data Encryption Standard (TDES) algorithm; or
a Skipjack algorithm.

17. The system of claim 14, wherein said single-port communication protocol is Secure Sockets Layer (SSL) protocol.

18. The system of claim 14, wherein:
a portion of said plurality of packets from said two or more ports conform to Transmission Control Protocol (TCP);
another portion of said plurality of packets from said two or more ports conform to User Datagram Protocol (UDP); and
wherein said single-port communication protocol uses said TCP.

19. The system of claim 14, wherein said first and second network devices send alternate data instead of requested data in response to a resend request.

20. The system of claim 14, wherein said first network device qualifies said multiport packets, wherein said qualifying comprises:
registering a third network device with said first network device;
using network ports by said third network device;

determining whether said plurality of multiport packets originated from a network port used by said third network device; and allowing further transmission of said plurality of multiport packets based on said determining.

21. The system of claim 14, wherein said selected one of the plurality of different commonly-open TCP ports is a well-known port.

22. The system of claim 14, wherein said selected one of the plurality of different commonly-open TCP ports is port 443.

23. A method comprising:

receiving, at a first intermediary network device that is communicatively coupled with a source conununication device, a plurality of multiport packets of data from two or more ports for communication from said source communication device, said plurality of multiport packets having at least one original communication protocol;

encrypting the plurality of multiport packets, thereby resulting in encrypted packets;

encapsulating the encrypted packets into a plurality of single-port packets in a single-port communication protocol that is acceptable by any of a plurality of different commonly-open ports, thereby resulting in encapsulated packets;

transmitting from said first intermediary network device said encapsulated packets over a selected one of the plurality of different commonly-open ports, wherein said encapsulated packets traverse one or more firewalls between said first intermediary network device and a second intermediary network device using said selected one of the plurality of different commonly-open ports;

receiving, at said second intermediary network device that is communicatively coupled with a destination communication device, said encapsulated packets from said selected one of the plurality of different commonly-open ports;

decrypting the received encapsulated packets, thereby resulting in decrypted packets;

restoring the decrypted packets to the at least one original communication protocol, thereby resulting in restored multiport packets; and distributing, from said second intermediary network device, each of said restored multiport packets to said two or more ports for communication to said destination communication device.

24. The method of claim 23, wherein said encrypting is according to one of:

an Advanced Encryption Standard (AES) 128-bit algorithm;

a Triple Data Encryption Standard (TDES) algorithm; or a Skipjack algorithm.

25. The method of claim 23, wherein said single-port communication protocol is Secure Sockets Layer (SSL) protocol.

26. The method of claim 23, wherein:

a portion of said plurality of multiport packets from said two or more ports conform to Transmission Control Protocol (TCP);

another portion of said plurality of multiport packets from said two or more ports conform to User Datagram Protocol (UDP); and wherein said single-port communication protocol uses said TCP.

27. The method of claim 23, wherein said first and second intermediary network devices send alternate data instead of requested data in response to a resend request.

28. The method of claim 23, further comprising qualifying said multiport packets, wherein said qualifying comprises:

registering a third network device with said first intermediary network device;

determining whether said plurality of multiport packets originated from said third network device; and allowing further transmission of said plurality of multiport packets based on said determining.

29. The method of claim 23, wherein said selected one of the plurality of different commonly-open ports is a well-known port.

30. The method of claim 23, wherein said selected one of the plurality of different commonly-open ports is port 443.

* * * * *